United States Patent

[11] 3,607,947

| [72] | Inventor | John Penfold |
| | | Runcorn, England |
| [21] | Appl. No. | 735,553 |
| [22] | Filed | June 10, 1968 |
| [45] | Patented | Sept. 21, 1971 |
| [73] | Assignee | Imperial Chemical Industries Limited |
| | | London, England |
| [32] | Priority | June 15, 1967 |
| [33] | | Great Britain |
| [31] | | 27734/67 |

[54] 1,2-BIS [P-(HYDROXYBENZYL) PHENOXY] ETHANE
1 Claim, No Drawings

[52] U.S. Cl. ...................................................... 260/613 R,
260/2.5 F, 260/52, 117/121
[51] Int. Cl. .............................................................. C07c 39/12
[50] Field of Search ............................................. 260/613, 613 R

[56] References Cited
UNITED STATES PATENTS

| 2,723,241 | 11/1955 | De Groote et al. | 260/613 |
| 3,054,773 | 9/1962 | Wilgus | 260/613 |
| 3,205,198 | 9/1965 | Deanin et al. | 260/613 |
| 3,428,691 | 2/1969 | Spacht | 260/613 |

FOREIGN PATENTS

| 1,092,026 | 11/1960 | Germany | 260/613 |

*Primary Examiner*—Bernard Helfin
*Attorney*—Cushman, Darby & Cushman

ABSTRACT: Preparation of the polyphenol, 1,2-bis [P-(hydroxy-benzyl)Phenoxy] ethane, and the reaction of said polyphenol with formaldehyde to prepare a resole from which are prepared resin forms.

1,2-BIS [P-(HYDROXYBENZYL) PHENOXY] ETHANE

This invention relates to novel foamed resins of the kind derived from phenolic resoles. It also relates to the production of these foamed resins, to the production of the novel resoles from which these foamed resins may be derived, and to the synthesis of novel intermediates used in the production of the resoles.

Foamed resins of the kind referred to are cured phenolic resole shapes having a cellular structure. They may be obtained from the resole by mixing it with a compound which is capable of yielding a gas or vapor under the curing conditions and then treating the resole, e.g. by acidification and/or heat, to cause simultaneous foaming and curing.

By phenolic resoles we mean acid-curable materials, usually aqueous syrups, obtained by hydroxymethylating phenolic compounds (that is, compounds whose molecules each have a benzene ring having at least one hydroxyl group and a hydrogen atom on at least one carbon atom ortho or para to the hydroxyl-bearing carbon atom) with at least an equimolar amount of formaldehyde under basic conditions. The phenolic compound is usually a mononuclear phenol; that is, a phenolic compound having only one aromatic ring, e.g. as in phenol, which is the most preferred example, and as in m-cresol, p-cresol and resorcinol. The formaldehyde is usually supplied from a source thereof, e.g. paraformaldehyde.

Foamed resins from phenol-formaldehyde resoles are in use as heat and sound insulation materials for building applications, and as packaging materials for the protection of good in transit. However, they suffer from a major drawback; they tend to be brittle and to lack adequate abrasion resistance.

According to the present invention, we provide a foamed resin of the kind derived from a phenolic resole wherein the resole is derived from phenolic material which consists of or contains a polynuclear polyphenol obtained by the condensation under neutral or acidic conditions of at least 2 moles of a mononuclear phenol with 1 mole of a dihalide having the structure:

$$XCH_2—\Phi'—O—(CH_2)_n—O—\Phi'—CH_2X \quad (I)$$

where each X is halogen, generally chlorine or bromine, each $\Phi'$ is a phenylene group or an alkyl, alkoxy and/or halogen substituted derivative thereof, and $n$ is a whole number of from 2 to 6. The alkyl and alkoxy groups on the phenylene group, if any, will not normally have more than six carbon atoms.

These foams have improved abrasion resistance and toughness compared with conventional foams, e.g. from phenol-formaldehyde resoles.

Also according to the invention, we provide resoles derived from phenolic material which consists of or contains said polynuclear polyphenols.

Still further according to the invention we provide the polynuclear polyphenols derived from the condensation under neutral or acid conditions of at least 2 moles of a mononuclear phenol with 1 mole of the above-defined dihalide.

The dihalide having the structure (I) may be obtained by slurrying the corresponding diphenoxyalkane of the structure 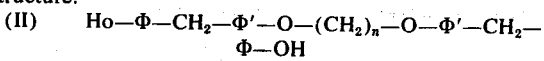 with paraformaldehyde in acetic acid, passing hydrogen halide through the slurry and maintaining the reaction mixture at about 30° to 40° C. The paraformaldehyde should be used in an amount to yield at least 2 moles of formaldehyde per mole of the diphenoxyalkane. Very efficient stirring is desirable if high yields are to be obtained. Generally the reaction takes about 6 to 8 hours when the diphenoxyalkane is 1,2-diphenoxyethane. Somewhat longer times may be necessary when $n$ is greater than 2. The product may be recovered by filtration. It may be separated from unreacted diphenoxyalkane by use of a selected solvation, e.g. using methanol as solvent.

The diphenoxyalkane used in the preparation of the dihalide may be prepared by heating the corresponding α,ω-alkylene dichloride of the structure $Cl(CH_2)_nCL$ with excess phenol in the presence of sodium hydroxide. The product precipitates from the reaction medium.

The nature of the polynuclear polyphenol depends not only upon the nature of the mononuclear phenol and the nature of the dihalide used in its formation but also upon the molar ratio of the one to the other in the reaction. In particular, this molar ratio appears to have a determining effect upon the molecular weight in that as the concentration of mononuclear phenol is increased, so there is a tendency toward obtaining lower molecular weight products, and ultimately, e.g. at a mononuclear phenol/dihalide molar ratio of 3:1 or more, the product tends to be essentially a tetranuclear diphenol of the structure:

(II) 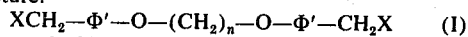
$\Phi—OH$ where $\Phi'$ has the meaning assigned above and $\Phi$ is the divalent residue of the mononuclear phenol $H\Phi OH$ used in the condensation. Preferably $\Phi$ is a phenylene group. However it may also be a derivative thereof wherein one or more of the hydrogen atoms have been replaced by monovalent groups selected from alkyl, alkoxy and hydroxy; the alkyl and alkoxy groups (if any) normally containing from one to six carbon atoms.

As the molar ratio of mononuclear phenol to dihalide is reduced from 3:1 towards 2:1, so the tendency towards the production of higher molecular weight products increases, for example by the condensation of further molecules of the structure (I) with the $\Phi$ groups of the compound of the structure (II).

Where the product is to be used in the production of resoles in accordance with our invention, it is much preferred to adjust the conditions of the reaction between the mononuclear phenol and dihalide to produce a tetranuclear diphenol of the structure II. The use of polynuclear polyphenols containing more than two residues of the structure $—CH_2—\Phi'—O—(CH_2)_n—O—\Phi'—CH_2—$ is preferably avoided because they tend to precipitate out of the reaction mixture during the resole-forming step.

For the ultimate production of foams having a useful combination of properties, and in particular having improved abrasion resistance and toughness compared with foams from conventional phenol-formaldehyde resoles, we prefer to use polynuclear diphenols of the structure II wherein $-\Phi'—$ and $—\Phi—$ are each $—C_6H_4—$, and $n$ is 2. Particular examples are 1,2-bis(p-[hydroxybenzyl]phenoxy) ethanes e.g. as in 4,4'-bis(p-hydroxy-benzyl)-1,2)-diphenoxyethane. For more rubbery resins and foams a polynuclear diphenol wherein, for example, $n$ is 6 may be used.

Production of Polynuclear Poylphenol

The polynuclear polyphenols of our invention may be formed by the polycondensation of the mononuclear phenol with the dihalide under neutral or acid conditions. If desired, the reaction may be effected in solution and an example of a suitable solvent is sulfolane. Chlorinated hydrocarbons may also be used, if desired, provided that they do not interfere with the production of the polynuclear polyphenol. Preferably, however, the use of solvent is avoided so as to obviate the need for solvent recovery operations.

To achieve acceptable rates of reaction, it is preferred to heat the mixture and, where no solvent is present, it is generally desirable at least to supply sufficient heat to melt the mixture. Most preferably, the temperature of reaction is about 60° to 100° C. Higher temperatures tend to promote the formation of the higher molecular weight products which tend to precipitate during the resole-forming step. Moreover, with the use of such higher temperatures, precautions may be required to prevent loss of mononuclear phenol through distillation. At lower temperatures, e.g. below 50° C., reaction times of 10 hours or even longer may be required.

It has been found useful to aid the condensation by the addition of a Friedel-Crafts catalyst. Preferably, the Friedel-Crafts catalyst is a mild acid so as to avoid the danger of scission and rearrangement of the dihalide at an ether oxygen atom. An example of a suitable Friedel-Crafts catalyst is zinc chloride.

In general, it is found desirable to use at least 0.05 percent of catalyst by weight of compound having the structure I, and usually from 0.1 to 3 percent. Amounts below 1 percent are preferred, however, because of the problems involved with neutralizing larger amounts in the products obtained from the reaction.

As has been stated above, the nature of the polynuclear polyphenol obtained from this reaction is dependent not only upon the nature of the mononuclear phenol and of the dihalide but also upon the ratio of the one to the other. With the preferred combination of phenol itself and a 1,2-bis(halomethylphenoxy)ethane, we have found that even at phenol/dihalide molar ratios of 3:1, and sometimes as high as 5:1, high melting point compounds of high molecular weight which are not entirely soluble in phenol may be obtained. Therefore, in order to ensure the production of materials which will yield resoles convertible to foams of even texture, we have found it desirable to use ratios of above 5:1, e.g. of 7:1 or even higher, for example from 10:1 to 20:1. In this manner, the production of insoluble polynuclear polyphenols may be reduced or avoided entirely.

We have also found it advantageous to add the dihalide to the molten mononuclear phenol slowly over a period of several minutes, or even hours, since this also tends to reduce the production of insoluble materials.

If desired, the reaction may be effected under anoxygenic conditions, for example under an inert gas e.g. nitrogen, to avoid oxidation of the mononuclear phenol, particularly where this is phenol itself. However, the reaction generally proceeds satisfactorily without the need to take this precaution. Pressure is not required but stirring is desirable.

The reaction may be followed by watching the evolution of hydrogen halide and may be assumed to be complete when evolution ceases. On completion of the reaction, the mixture may be cooled and the catalyst residues and any hydrogen chloride dissolved in the product neutralized, e.g. by addition of base.

The polynuclear polyphenols obtained from this reaction may then be separated from any unreacted mononuclear phenol, recovered, and converted to resoles in known manner.

However, we have found that for economic reasons and for conversion to foams and resins having the most desirable combination of properties, it is desirable for the polynuclear polyphenol to be used in admixture with at least one other phenolic compound in the production of the resole. Alternatively, the polynuclear polyphenol may be added to a preformed resole of conventional kind. It is particularly profitable, however, when using excess mononuclear phenol in the production of the polynuclear polyphenol, e.g. to ensure the production of preferred tetranuclear diphenol, to use the product mixture in the resole-forming reaction.

Product mixtures which are particularly notable for the physical properties they donate to resins and foams derived from resoles obtained therefrom, contain at least 4 moles of mononuclear phenol per mole of polynuclear polyphenol. At ratios much greater than about 10 moles per mole, however, the concentration of the polynuclear may be insufficient to produce significant improvements in the properties of the resins and foams derived from the resoles so produced. Preferred molar ratios are from about 5:1 to about 8:1.

To obtain such mixtures, it will be understood that when the polynuclear polyphenol to be used is the much preferred tetranuclear diphenol, it is desired to commence from mixtures of mononuclear phenol and dihalide in the molar ratios of 6:1 to 12:1, preferably 7:1 to 10:1. Where it is not convenient to use such ratios, e.g. because of the dangers of obtaining undesirable insoluble high molecular weight byproducts, the molar ratio of mononuclear phenol to tetranuclear diphenol in the product mixture may be adjusted, for example, either by adding further mononuclear phenol or, more usually, by removing excess mononuclear phenol, e.g. by distillation, whichever is desired.

Where it is proposed to use the product mixture from the polynuclear polyphenol forming step, either with or without adjustment of the molar ratio of the components, it is particularly convenient to combine into a single operation the steps of neutralising the Friedel-Crafts catalyst and hydrogen chloride present in the product mixture and rendering the mixture basic for the resole-forming reaction. Thus, sufficient base may be added to neutralize the catalyst, e.g. as shown by a pH paper test, and then an excess of preferably 1 to 1.5 percent by weight (based on the weight of mononuclear phenol used in the reaction) may be added.

A base such as is used in conventional phenolic resole production is preferred and examples are alkali metal hydroxides and carbonates, barium hydroxide and organic bases e.g. triethylamine. Profitably, the base may be added as an aqueous solution the amount of water being chosen to adjust the viscosity such that the resole derived from the mixture has the most suitable viscosity for conversion to foams of good physical properties. For this purpose it is preferred to arrange that the resole viscosity is equivalent to 100 to 300 Gardner-Holtz seconds. Production of Resole The polynuclear polyphenols, aloe or in admixture with other phenolic compound or compounds, may be converted to resoles in conventional manner for phenolic resoles; that is, by reaction with formaldehyde, or more usually an equivalent quantity of a formaldehyde source, under basic conditions and generally with the application of heat.

In order to obtain a rapid curing resole, it is profitable to use the source of formaldehyde in amounts to give at least one mole of formaldehyde per mole of phenolic hydroxyl group present. Where the phenolic component comprises the mixture obtained from reacting mononuclear phenol with dihalide, the amount of formaldehyde to be supplied may be calculated on the basis of the amount of mononuclear phenol in the original reaction mixture. Preferably, amounts of from 1 to 3 moles of formaldehyde per mole of mononuclear phenol are used. The amount of formaldehyde used may be varied if desired, to adjust the exotherm of the curing reaction of the resole. Reducing the amount of formaldehyde supplied tends to increase the exotherm and vice versa.

Preferably, the resole-forming reaction is aided by heat, and temperatures of from 80° to 100° C. have been found convenient. In general, reaction times of from 50 to 80 minutes are adequate when using temperatures of from 90° to 100° C. Completion of the reaction may be confirmed by obtaining negative results from a test for phenolic groups. However, in some cases, e.g. to obtain a desired combination of viscosity and cure exotherm, it may be desirable to stop the reaction before completion. The desired point may be established, for example, by sampling and measuring the properties of the sample.

As in the reaction to form the polynuclear polyphenol, the resole-forming reaction may, if desired, be effected under anoxygenic conditions to avoid inadvertent oxidation of the phenolic material, especially where this includes phenol itself. However, we have obtained satisfactory results without taking this precaution.

The use of superatmospheric pressures is recommended where it is desired to increase the rate of reaction by the use of higher temperatures, and it is also preferable to stir the mixture. On completion of the reaction and cooling, a viscous syrup or glassy solid is generally obtained which may tend to be opaque at room temperature although it generally becomes transparent on warming. Preferably, the pH of the resole is reduced to a value of about 7 to 9 so as to provide a material which is stable on storage, the lower values providing the more stable products. Most preferably, the pH is adjusted to about 7. Where the resole is intended to be converted to a foamed product it is preferred to adjust its viscosity, if necessary, to correspond to about 100 to 300 Gardner-Holtz seconds. This may be done simply by adding or removing water.

Resins may be obtained by curing these resoles in the conventional manner for phenolic resoles, that is by adjusting the pH to less than 7, e.g. by the addition of acid. Excess acid may be used, if desired, to increase the exotherm, and heat may be applied to obtain faster curing. Mineral acids are widely used and hydrochloric acid has been found to be very satisfactory.

Production of Foams

Foamed products may be obtained by mixing the resole with a compound which will yield gas or vapor, e.g. by boiling or by chemical reaction, under the conditions chosen for curing and then curing the mixture. Any conventional gas- or vapor-generating compound used in the production of phenolic foams may be used. Preferred examples, however, are low boiling hydrocarbons and fluorocarbons, e.g. n-pentane, monofluorotrichloromethane and 1,1,2-trichloro-1,2,2-triflouroethane. The amount added will depend upon the density required in the product but amounts of from 1 to 15 percent of the total weight of the mixture are usual, from 6 to 10 percent being preferred. The mixing process is carried out under conditions at which little or no gas or vapor generation will occur.

In order to improve the uniformity of the pore size in the foamed products, it has been found advantageous to add a surfactant, preferably a nonionic surfactant, to the mixture of resole and gas-generating compound. The use of such surfactants is well-known in the phenolic resole foam art and concentrations of from 1 to 5 percent by weight of resole are generally used.

The mixture may be cured by adjusting the pH thereof to less than 7. The exotherm may be increased somewhat, if desired, by addition of excess acid, and heat may be applied to obtain faster curing. As is known in phenolic foam art, the acid may be used in admixture with an inert diluent in order to aid the speedy production of a smooth mix before the onset of curing.

The foamed products from our preferred mixtures of phenol and 1,2-(bis-p-[hydroxybenzyl]phenoxy)ethanes are especially notable for their improved toughness and abrasion resistance compared with conventional phenol-formaldehyde foams of the same density. In this respect, the 1,2-bis-p-[hydroxybenzyl]phenoxy)ethanes appear to have a greater effect even than bis-p-(hydroxybenzyl)diphenyl ethers. For example, the abrasion resistance of foams obtained from resoles derived from mixtures of phenol and bis-p-(hydroxybenzyl)diphenyl ethers in a molar ratio of 2:1 may be matched or even improved upon in foams from resoles derived from mixtures of phenol and 1,2-bis-p-(hydroxybenzyl)phenoxy ethanes where the molar ratio is as high as 5:1. As one consequence of these improved properties, the foams may replace conventional phenol-formaldehyde foams of higher density in structural applications such as, for example, roof decking with a consequent saving in weight. Some of the preferred foams of our invention also differ from conventional phenol-formaldehyde foams by exhibiting nonbrittle fracture. In their reluctance to support combustion, their low toxic vapor content on combustion, and their resistance to penetration by a naked flame, these foams substantially retain the characteristics of conventional phenol-formaldehyde resins and are sometimes superior. Their color is white and they are less prone to fading with time. The preferred foams of our invention, therefore, are of particular interest in building applications where such properties are much desired.

The foams may be used as unmodified slabstock, e.g. in packaging applications, or may also be used in the form of laminates, e.g. where one or more faces of a foamed slab are covered by a thin sheet material, preferably of high bulk modulus, e.g. asbestos, paper, cardboard, hardboard, plasterboard, formica, metal or synthetic resin e.g. poly(vinyl chloride) or polyolefin e.g. polyethylene. Sandwich structures with the foam in between two parallel spaced thin sheet materials of high bulk modulus are of particular use as building components, e.g. as partitioning.

The laminates may be formed, for example, by coating the sheet material with the uncured foamable mixture and then foaming and curing it in situ. Alternatively the uncured foamable mixture may be fed between two substantially parallel spaced sheets and allowed to foam and cure in place between them to form a sandwich structure. Both methods are readily adapted to continuous operation.

The invention is now illustrated by the following Examples in which all parts are expressed as parts by weight.

1. EXAMPLE

Preparation of 1,2-bis(p-chloromethylphenoxy)ethane.

471.5 Parts of 1,2-diphenoxyethane were transferred to a reaction vessel fitted with an efficient stirrer, a thermometer and gas inlet and exit tubes. 165.2 Parts of paraformaldehyde were then added to the vessel followed by approximately 2100 parts of glacial acetic acid and a slurry was formed. Stirring was commenced and hydrogen chloride gas was passed through the stirred slurry at a rate of 1460 parts per hour. Absorption of the gas was initially very high, being about 15 parts/minute for the first 30 minutes. During this initial period, a considerable exotherm occurred but the temperature of the mixture was prevented from exceeding 37° C. by cooling, using acetone/solid carbon dioxide mixture. The hydrogen chloride was passed for a total period of 9½ hours and the reaction temperature during that time was maintained at 35° to 37° C.

The product so obtained was diluted with water and filtered, and the precipitate was washed with a large volume of cold water and neutralized to pH 7 by addition of concentrated sodium bicarbonate solution. The precipitate was then slurried with industrial methylated spirits at 45° C. with vigorous stirring and the hot slurry was filtered. The product was then washed with 40°-60° petroleum ether, recovered, and dried in an oven at 55° C. for 24 hours. 685.1 parts of 1,2-bis(p-chloromethylphenoxy) ethane were obtained which melted at 148° C. (as observed on a polarizing hot stage microscope). Elemental analysis was as follows, the theoretical figures being included in brackets.

C 63.12% (61.74%)
Cl 5.22% (5.14%
Cl 21.83% (22.83%)

Preparation of polynuclear polyphenol

188 Parts of phenol were melted in a reactor flask at 50° C. and 1 part of aluminum chloride added with stirring. 309 Parts of 1,2-bis(p-chloromethylphenoxy)ethane were added and the temperature raised to 75° C. Ethylene dichloride was added to dissolve the dihalide and the reaction was allowed to proceed at 75° C. with stirring for 5 hours. The flask was then cooled and a glassy solid was recovered. This was washed with methanol to free it from unreacted phenol. The washed product, which still contained about 5 percent by weight of phenol, melted in the range 130° to 135° C. The infrared spectrum indicated that condensation had occurred in accordance with the expected Friedel-Crafts reaction.

Production of resole and foam.

This product could be mixed with more phenol and the mixture converted to a resole by heating with paraformaldehyde under basic conditions. Even with the use of quite large concentrations of phenol, the resole so obtained requires filtering to remove lumps of insoluble material. Foams may be obtained from the filtered resole by mixing the resole with 1,2,2-trichloro-1,1,2-triflouroethane as gas-generating compound, hydrochloric acid as catalyst and a nonionic surface active agent used in conventional phenol-formaldehyde resole foam manufacture, and allowing the mixture to cure.

EXAMPLE 2

849 Parts of phenol were melted in a glass reactor fitted with a stirrer, powder funnel and thermometer pocket, and heated by means of an oil bath, and 4.22 parts of powdered zinc chloride were added to the molten phenol. 562 Parts of 1,2-bis(pchloromethylphenoxy)ethane were then added to the heated mixture over a period of 4½ hours. A vigorous evolution of hydrogen chloride took place and the reaction was continued until no further evolution was apparent when the vapors were tested with litmus. The total reaction time was 11 hours. The mixture, which contained phenol and 1,2-bis(p-[hydroxybenzyl]phenoxy)ethane in a molar ratio of approximately 3:1, was then cooled. To 630 parts of this mixture were added a further 172 parts of phenol to raise the molar ratio of phenol to tetranuclear diphenol to 5:1. The addition was carried out at a temperature of from 55° to 73° C. The mixture was then cooled and found to solidify at 30°/35° C. After cooling, it was reheated and neutralized with 20 percent sodium hydroxide to a pH of 7 to 7.5, and then cooled again.

Production 423 Parts of this mixture were then melted and 211 parts of paraformaldehyde were added at a temperature of 60° to 70° C., together with 4 parts of sodium hydroxide and 96 parts of water. The mixture was heated and stirred for 40 minutes.

The resole so formed was then filtered while still hot in order to remove any insoluble lumps that had formed, and from the filtrate 2 foams were prepared as follows:

Foam A was prepared by mixing together 200 parts of the resole, 5 parts of a nonionic surface active agent used in the production of foams from conventional phenol-formaldehyde resoles, 28.5 parts of 1,1,2-trichloro-1,2,2-triflouroethane and 20 parts of a 50/50 volume mixture of hydrochloric acid (sp.gr. 1.18) and an inert diluent for the acid, which diluent is used in the production of foams from conventional phenol-formaldehyde resoles, and the cream was poured into a container preheated to about 50° C. and allowed to rise and cure. Foam B was prepared in the same manner and using the same recipe as Foam A except that the concentration of trichlorotrifluoroethane was reduced to 24 parts.

The times required for the foams to rise and set (that is, change form fluid to solid) are tabulated below.

|  | Foam A | Foam B |
| --- | --- | --- |
| Rise time | 20 minutes | 7 minutes |
| Set time | 28 minutes | 25 minutes |

Both foams were then heated at 50° C. for a further 17 hours to ensure that curing was complete.

The resistance to abrasion of the foams was measured using the method and apparatus described on page 241 of the May 1961 issue of "British Plastics," using a No. 180/E grade disc. The recorded abrasion time is a measure of the resistance of the foam to abrasion. It is also a reflection of the impact strength of the resin. The abrasion times of the foams are recorded below together with those of foams of the same density derived (a) from a conventional phenol-formaldehyde resole and (b) from a resole prepared from a 2:1 molar mixture of phenol and bis-p-(hydroxybenzyl)diphenyl ether (obtained from the condensation of two moles of phenol with one mole of bis-p-(chloromethyl) diphenyl ether.

|  | Foam A (density 2.95 lbs./cu. ft.) | Foam B (density 3.20 lbs./cu.ft.) |
| --- | --- | --- |
| Abrasion time | 90 seconds | 104 seconds |
| Abrasion time for foam of same density from conventional phenol-formaldehyde resole. | 79½ seconds. | 87 seconds |
| Abrasion time for foam of same density from resole derived from 2:1 phenol/bis-p-(hydroxylbenzyl) diphenyl ether. | 90 seconds | 100 seconds. |

EXAMPLE 3

The foam production method of example 2 was repeated using basically the same foam recipe but with varying amounts of 1,1,2-trichloro-1,2,2-trifluoroethane in order to form foams of various densities. The compression moduli and compressive strength of these foams were then measured on a Type E Hounsfield Tensometer at room temperature, using a crosshead speed of 0.556 inch/minute and a specimen 2 inches × 2 inches × 1 inch thick.

The results are tabulated on the following page.

| Foam identification | Density (lbs./cu.ft.) | Compression modulus lbs./sq.in.) (measured parallel to the foam rise direction) | Compressive strength lbs./sq.in.) |
| --- | --- | --- | --- |
| C | 2.09 | 1015 | 21.3 |
| D | 2.21 | 803 | 21.3 |
| E | 2.58 | 1695 | 37.8 |
| F | 2.65 | 1819 | 34.1 |
| G | 2.75 | 1934 | 32.7 |
| H | 2.90 | 1712 | 40.2 |
| J | 3.39 | 2580 | 35.9 |

Foams E F and H showed nonbrittle failure, unlike those obtained from conventional phenol-formaldehyde resoles.

What we claim is:
1. The polynuclear polyphenol 1,2-bis[p-(hydroxybenzyl)phenoxy]p-(hydroxy-benzyl)phenoxyl] ethane.